(12) United States Patent
Beigi et al.

(10) Patent No.: US 6,253,179 B1
(45) Date of Patent: Jun. 26, 2001

(54) METHOD AND APPARATUS FOR MULTI-ENVIRONMENT SPEAKER VERIFICATION

(75) Inventors: Homayoon S. Beigi, Yorktown Heights; Upendra V. Chaudhari, Elmsford, both of NY (US); Stephane H. Maes, Danbury; Jeffrey S. Sorensen, Seymour, both of CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,346

(22) Filed: Jan. 29, 1999

(51) Int. Cl.$^7$ .............................. G10L 15/06; G10L 15/20
(52) U.S. Cl. ............................................ 704/243; 704/246
(58) Field of Search ...................................... 704/243, 244, 704/245, 246, 250, 233, 273

(56) References Cited

U.S. PATENT DOCUMENTS

| | | | |
|---|---|---|---|
| 5,687,287 | * 11/1997 | Gandhi et al. | 704/247 |
| 5,806,029 | * 9/1998 | Buhrke et al. | 704/244 |
| 5,963,906 | * 10/1999 | Turin | 704/243 |
| 6,006,184 | * 12/1999 | Yamada et al. | 704/246 |
| 6,038,528 | * 3/2000 | Mammone et al. | 704/245 |
| 6,058,205 | * 5/2000 | Bahl et al. | 704/231 |
| 6,073,096 | * 6/2000 | Gao et al. | 704/245 |
| 6,073,101 | * 6/2000 | Maes | 704/246 |
| 6,081,660 | * 6/2000 | Macleod et al. | 704/240 |
| 6,107,935 | * 8/2000 | Comerford et al. | 704/246 |

OTHER PUBLICATIONS

Rosenberg et al., "Speaker background models for connected digit password speaker verification," 1996 IEEE International Conference on Acoustics, Speech, and Signal Processing, vol. 1, May 1996, pp. 81 to 84.*

Li et al., "Normalized discriminant analysis with application to a hybrid speaker–verification system," 1996 IEEE International Conference on Acoustics, Speech, and Signal Processing, vol. 2, May 1996, pp. 681 to 684.*

* cited by examiner

*Primary Examiner*—William R. Korzuch
*Assistant Examiner*—Martin Lerner
(74) *Attorney, Agent, or Firm*—F. Chau & Associates, LLP (57) ABSTRACT

A method for unsupervised environmental normalization for speaker verification using hierarchical clustering is disclosed. Training data (speech samples) are taken from T enrolled (registered) speakers over any one of M channels, e.g., different microphones, communication links, etc. For each speaker, a speaker model is generated, each containing a collection of distributions of audio feature data derived from the speech sample of that speaker. A hierarchical speaker model tree is created, e.g., by merging similar speaker models on a layer by layer basis. Each speaker is also grouped into a cohort of similar speakers. For each cohort, one or more complementary speaker models are generated by merging speaker models outside that cohort. When training data from a new speaker to be enrolled is received over a new channel, the speaker model tree as well as the complementary models are updated. Consequently, adaptation to data from new environments is possible by incorporating such data into the verification model whenever it is encountered.

19 Claims, 7 Drawing Sheets

METHOD AND APPARATUS FOR MULTI-ENVIRONMENT SPEAKER VERIFICATION

TECHNICAL FIELD

The present invention relates generally to the field of speaker verification.

BACKGROUND OF THE INVENTION

The use of speaker verification systems for security and other purposes has been growing in recent years. In a conventional speaker verification system, speech samples of known speakers are obtained and used to develop some sort of speaker model for each speaker. Each speaker model typically contains clusters or distributions of audio feature data derived from the associated speech sample. In operation of a speaker verification system, a person (the claimant) wishing to, e.g., access certain data, enter a particular building, etc., claims to be a registered speaker who has previously submitted a speech sample to the system. The verification system prompts the claimant to speak a short phrase or sentence. The speech is recorded and analyzed to compare it to the stored speaker model with the claimed identification (ID). If the speech is within a predetermined distance (closeness) to the corresponding model, the speaker is verified.

The environment in which the speech is sampled influences the characteristics of the recorded speech data, both for training data and test data. Thus, one of the design issues of a speaker verification system is how to account for the different environments in which training data and test data (of a claimant) are taken. Varying channels, e.g., different types of microphones, telephones or communication links, affect the parameters of a person's speech on the receiving end. In many speech verification systems, it must be assumed that any source of speech can be received over any one of a number of channels. Thus, any modifications that the channels cause in the source data must be accounted for, a procedure referred to as environment normalization.

Current approaches to channel (environment) normalization involve, in one form or another, a supervised training phase to separate and group the training and/or testing data according to a predetermined set of "models" corresponding to each of the channels. Channel dependent background models and statistics are then derived from these groups. A number of existing techniques compare received data to the claimed source model in light of the various background models. A different approach involves trying to make the data received over any of the channels look as if it was received over some canonical channel, thus mitigating the influence of the channel. Here again, the channels must be known so that they can be inverted. A shortcoming of these supervised training techniques is that, in some applications, they are unrealistic because of the requirement that each channel that may be used must be modeled and known ahead of time.

For other pattern matching problems aside from speech verification, environment normalization is likewise a problem that needs to be addressed. The general problem, which includes the speaker verification situation, is how to accept two patterns as being similar when the comparisons are (or may be) performed under mismatched conditions. The mismatched conditions may be, for example, different lighting conditions or shadows for face recognition; different noise conditions for image recognition; different foreground and lighting noise for background texture recognition; and different reception channels for speaker recognition.

SUMMARY OF THE DISCLOSURE

The present disclosure relates to a method for unsupervised environmental normalization for speaker verification using hierarchical clustering. In an illustrative embodiment, training data (speech samples) are taken from T enrolled (registered) speakers over any one of M channels, e.g., different microphones, communication links, etc. For each speaker, a speaker model is generated, each containing a collection of distributions of audio feature data derived from the speech sample of that speaker. A hierarchical speaker model tree is created, e.g., by merging similar speaker models on a layer by layer basis. Each speaker is also grouped into a cohort of similar speakers. For each cohort, one or more complementary speaker models are generated by merging speaker models outside that cohort. The complementary speaker model(s) is used to reduce false acceptances during a subsequent speaker verification operation.

When training data from a new speaker to be enrolled is received over a new channel, the speaker model tree as well as the complementary models are updated. Thus, adaptation to data from new environments is possible by incorporating such data into the verification model whenever it is encountered.

BRIEF DESCRIPTION OF THE DRAWINGS

The following detailed description, given by way of example and not intended to limit the present invention solely thereto, will best be appreciated in conjunction with the accompanying drawings, in which like reference numerals denote like parts or elements, wherein.

DETAILED DESCRIPTION OF CERTAIN PREFERRED EMBODIMENTS

A preferred embodiment of the invention will now be described in the context of a modeling method for use in a speech verification system. It is understood, however, that the invention may have other applications such as in performing image recognition under mismatched conditions.

Figure 1:
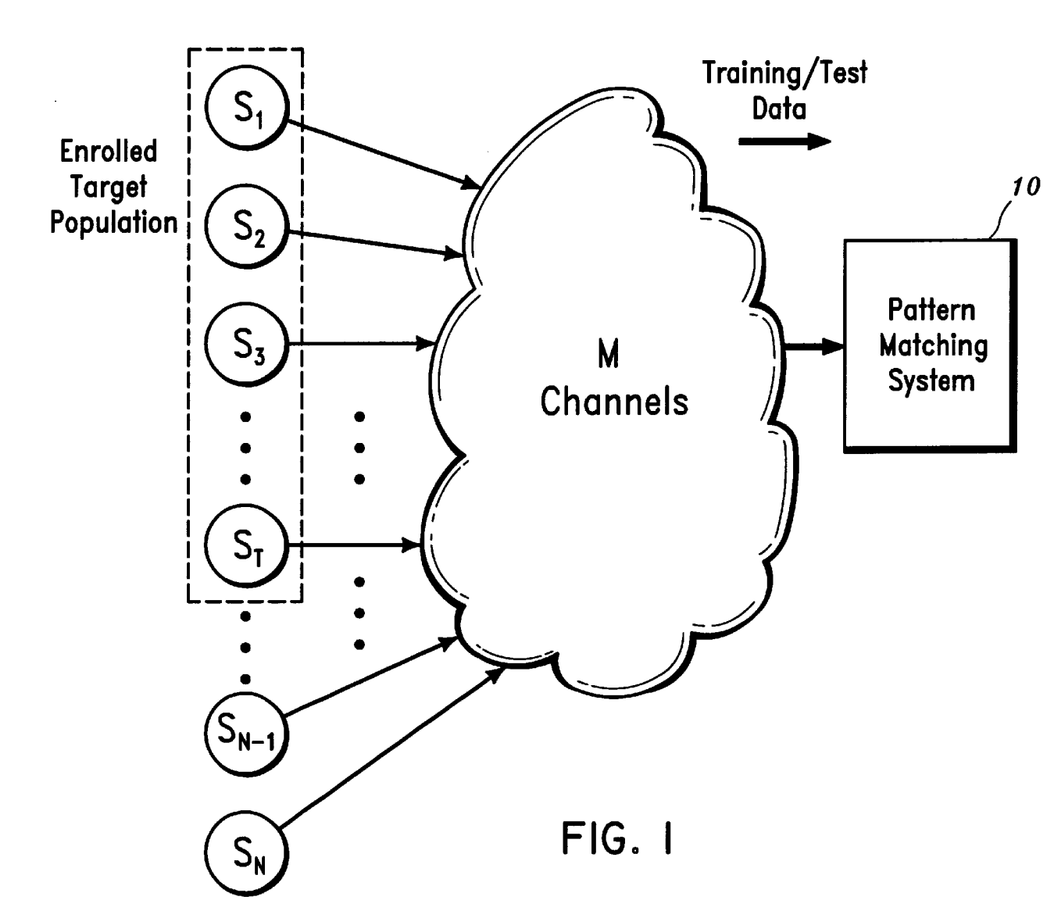
FIG. 1 is a diagram illustrating a speaker verification environment.

FIG. 1 is a diagram depicting a general environment in which speaker verification or image pattern matching may be performed. It is assumed that there are N sources $S_1$ to $S_N$, each of which outputs training or test data over any one of M channels at any given time, where M and N are typically different integers. The data is received by a pattern matching system 10, e.g., a camera/image recognition system, a speaker verification system or a speaker identification system. In the case of image pattern recognition, each source represents an image and each channel represents a different environment such as a particular lighting condition, shadow environment, foreground or lighting noise, or background scene. For the speaker verification or identification applications, the differing channels can correspond to differing microphones (microphone type or specific unit), telephones, and/or communication links. The ensuing description will focus on the speaker verification application.

The speaker verification problem is as follows: given a reception (test data) at some point in time (e.g. data from a current telephone call), along with a source identity claim (e.g. the speaker's name), the task is to verify that the received data was produced by the source with the claimed identity. Since it is assumed that any source can be received over any one of the M channels, any modifications that the channels cause to the source data must be accounted for. That is, environment normalization needs to be performed. In general, the number of sources N and the number of channels M will vary as time progresses. The sources (speakers) that the system is capable of verifying comprise the "enrolled target population", $S_1$ to $S_T$, which is a subset of the N sources.

Briefly, in accordance with the present embodiment, for each source $S_1$ to $S_T$ of the enrolled target population, a speech sample (training data) is initially obtained by the speech verification system 10 over any one of the M channels. Based on the initial data collected, the system generates a speaker model for each enrolled speaker. A hierarchical speaker model tree is derived from the speaker models. Each speaker is grouped into a cohort of similar speakers. A complementary model or models is generated for each cohort, representing a merger of speaker models within the enrolled population but outside the target cohort. Optionally, prior to performing any speaker verification, system 10 also generates a background model representing a background population based on data from sources ($S_{T+1}$ to $S_N$) which are outside the enrolled population. Subsequently, speaker verification is performed using the speaker model tree, the complementary model(s) and the background model. Whenever a new source is to be added to the enrolled target population, the training data from the new source, e.g. taken over a new channel, is added to the speaker model tree, thereby updating the tree. The complementary model(s) is updated as well. Accordingly, the technique for "unsupervised" environment normalization disclosed herein enables new environments to be handled without the need for a priori knowledge of their characteristics.

Figure 2:
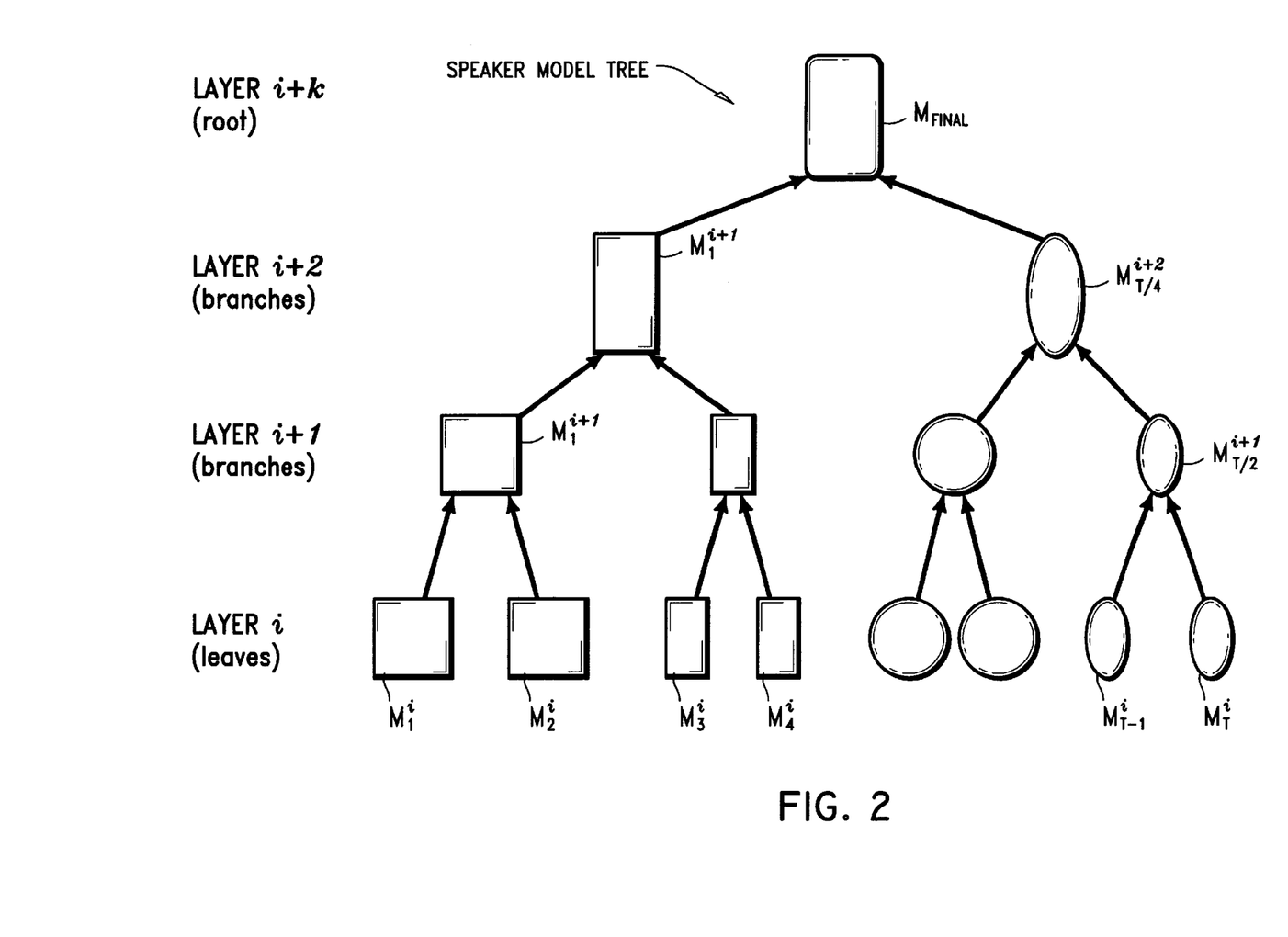
FIG. 2 is a diagram of a speaker model tree.

With reference now to FIG. 2, the hierarchical speaker model tree concept will be explained. An exemplary speaker model tree building process starts with T base speaker models $M_1^i$ to $M_T^i$ in the bottommost layer i. These base models in the bottommost layer will be referred to as the leaves of the tree. Each model in layer i contains a collection of distributions of feature vectors derived from a speech sample of a corresponding speaker in the enrolled target population, $S_1$ to $S_T$. Each speech sample is received over one of the M channels. An exemplary method to generate a speaker model from the speech sample (training data) is described in detail in copending U.S. patent application Ser. No. 09/237,063, filed on Jan. 26, 1999, entitled METHOD AND APPARATUS FOR SPEAKER RECOGNITION, which is incorporated herein by reference in its entirety. A software routine is carried out to perform a distance measure among the speaker models in layer i to determine, for each speaker model, which of the other models is the most similar thereto (i.e., which has the shortest distance to the model under consideration). In this manner, pairs of similar speaker models are established. It is noted, however, that a grouping criterion to determine which models should be paired up can be varied, in order to trade off channel properties and source properties. By determining which speaker models are the closest without regard to what channel the speech was received on, the grouping criterion matches both channel and source properties.

In any event, whatever grouping criterion is used, the speaker models of each pair are merged into a corresponding speaker model in the next higher layer i+1. As such, T/2 speaker models $M_1^{i+1}$ to $M_{T/2}^{i+1}$ are formed in branch layer i+1. These speaker models in layer i+1 are then compared to each other to establish pairs, and then merged in the same manner to thereby define T/4 merged models in the next higher branch layer i+2. The tree building process continues until all the models are merged into a single speaker model $M_{FINAL}$ (root of the tree) in the top layer, i+k. In essence, as each level of the tree is created, the new models in that generation are treated as new speaker models containing their two children, and the pairing/merging process is continued layer by layer until one root model is reached at the top of the tree. The resulting tree structure, which consists of all the models in the various layers, is used to perform processing-efficient speaker verification as will be discussed below. The tree structure can be represented as a tree with the following property: the similarity of any two or more leaves is proportional to the number of common ancestor nodes. It is noted that tree structures other than the binary structure of FIG. 2 can be employed. In the general case, for an n-ary tree, n speaker models in each layer are merged to form a corresponding parent in the next higher layer. If there is a remainder model in any layer, i.e., if a given layer is not divisible by n, the remainder model can be either merged into one of the parents in the next higher layer or added to the next higher layer as a separate entity.

A speaker model tree can alternatively be generated using a top down method as opposed to the bottom up approach just described. In the top down method, the initial partition is one set consisting of all of the sources, akin to the model $M_{FINAL}$ in FIG. 2. Then, a sequence of refinements is constructed, with the final one consisting of each of the singleton sources in its own subset, akin to models $M_1^i$ to $M_T^i$ in FIG. 2. (The term "refinement" is used here in the following context: a partition P2 is a refinement of partition P1 if every element of P2 is an element of a partition of an element of P1.) To construct a refinement, a splitting criterion is needed which separates the sources. The last (singleton) partitions are essentially the initial partitions for the above-discussed bottom up approach, in which the sequence of partitions is constructed so that a partition at any point in the sequence is always a refinement of a later partition. (The last partition of the bottom up approach is the first partition of the top down approach.)

Thus, with either the bottom up or top down approaches, the sequence of partitions can be represented as a speaker model tree. Assume now that the tree has D levels with the root being the 0th and the Dth level consisting only of the leaves. A "d-level cohort" for any leaf L is defined as the set of leaves with a common ancestor d levels up from the bottom (i.e., at level D-d) and containing the leaf L. Note that the number of channels is not a parameter here, so that as more sources are obtained over more channels, the tree can be grown or regenerated with these additional elements. Each leaf member is designated as part of a cohort of similar leaves.

Figure 3:
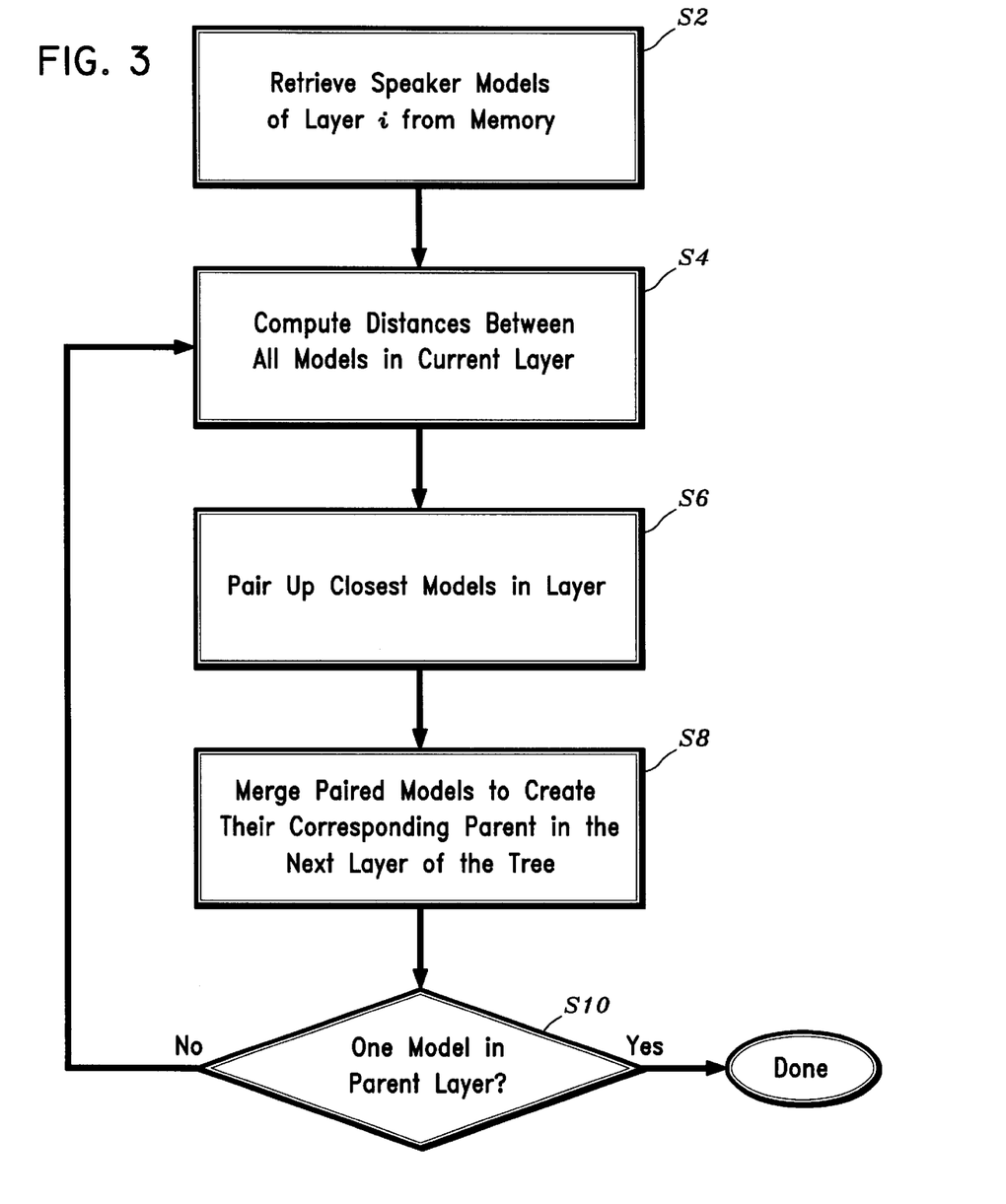
FIG. 3 is a flow diagram of an illustrative software routine for merging speaker models in a tree-like fashion.

Referring now to FIG. 3, there is shown a flow diagram of an exemplary software routine for producing the speaker model tree of FIG. 2 in a bottom-up fashion. The first step, S2, is to retrieve from memory all the speaker models $M_1^i$ to $M_T^i$ in the bottommost layer i. Next, the distances between all speaker models in the current layer (layer i, at this point) are computed (step S4). Based upon the distance measurements, the closest speaker models in the current layer are paired up (step S6). Note that with this unsupervised approach, since the channels over which the sources were received are not identified, the closest models represent the closest models in terms of a combination of speech characteristics and channel characteristics. The paired models are merged in step S8 to create their corresponding parent in the next layer of the tree. If, in step S10, one model remains in the parent layer thus formed, the tree building process is complete; otherwise, the routine returns to S4 to continue the merging process for subsequent parent layers.

It is noted here that program code for the routine of FIG. 3, as well as for the routines illustrated in the other figures herein, can be stored on a portable program storage device such as a CD-ROM or digital versatile disk (DVD). The program storage device is read by a general or special purpose computer which runs the routine. The present invention may alternatively be implemented in hardware or a combination of hardware and software (e.g., embedded system), thus creating in either case a special purpose computer.

The computation of the distances between the speaker models in step S4 is preferably accomplished in accordance with the method described in the above-mentioned copending U.S. patent application Ser. No. 09/237,063 entitled METHOD FOR MEASURING DISTANCE BETWEEN COLLECTIONS OF DISTRIBUTIONS, incorporated herein by reference in its entirety. Briefly, this method of measuring the distance between two speaker models entails computing the minimum distances between individual distributions of one speaker model to those of the other speaker model. The total distance between speaker models is approximately a weighted sum of those minimum distances.

As stated earlier, each leaf is designated as part of a cohort of similar speakers, where such similarity is determined by measuring distances among speakers. By way of example only, there may be upwards of one thousand enrolled speakers in the tree, with cohort sizes on the order of ten speakers. Briefly, to perform speaker verification, a claimant who claims to be a particular registered speaker provides a speech sample to the system. The speaker verification system generates a test model from the speech sample and compares it to all speaker models in the cohort that correspond to the target speaker (speaker with claimed ID). By comparing the test model only to the cohort members, as opposed to comparing it to every speaker model of the tree, the processing task is dramatically simplified. The speaker is verified only if the test model is closest to the target speaker model. If the claimant is an imposter and just happens to be closest to the target speaker model in the cohort that is picked, a false acceptance is reached. The false acceptance rate of the above speaker verification method is 1/(cohort size). Two "complementary model" methods can be used to reduce the occurrences of false acceptances. These are referred to herein as the Cumulative Complementary Model (CCM) method and the Graduated Complementary Model (GCM) method.

Figure 4:
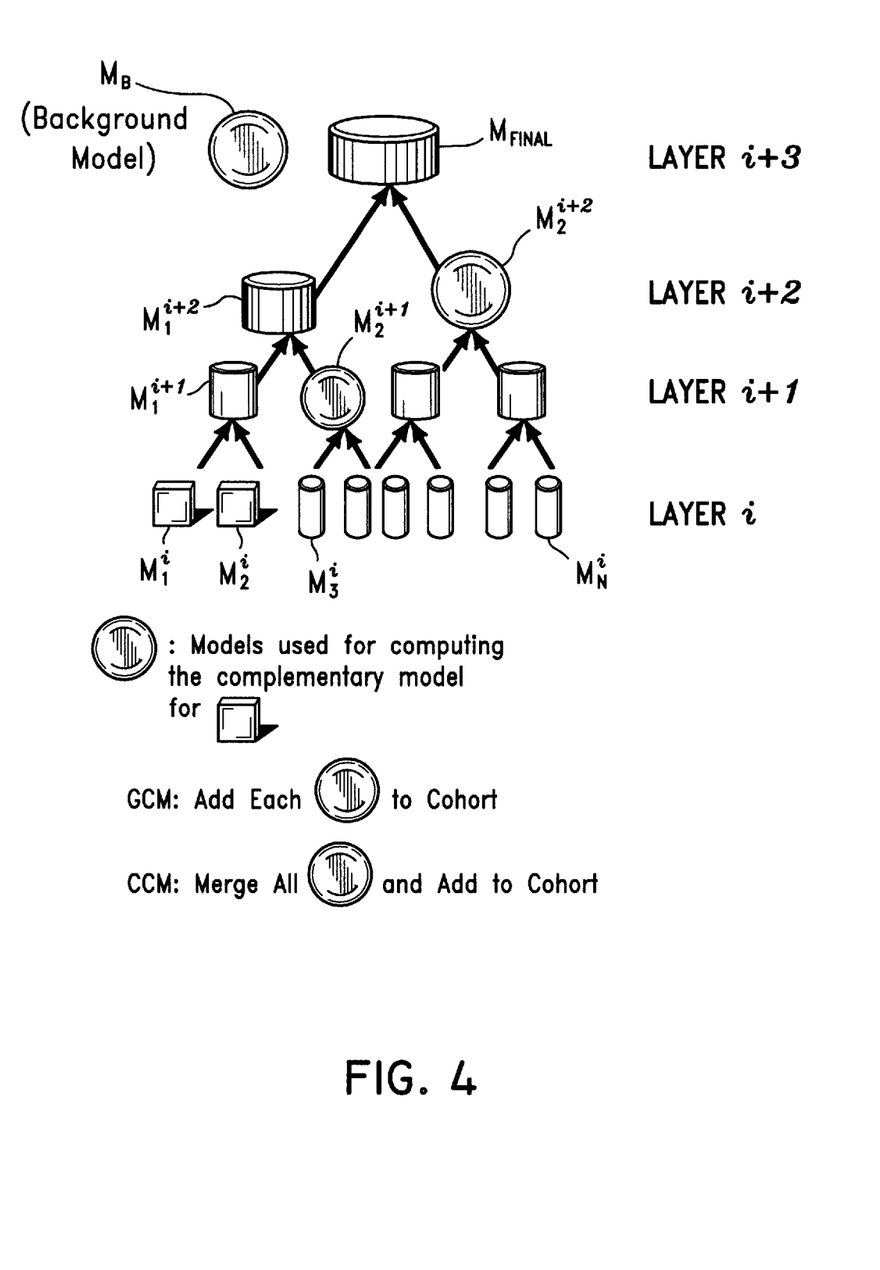
FIG. 4 is a diagram illustrating complementary speaker model generation.

Referring to FIG. 4, the principles underlying the CCM and GCM methods are illustrated. With either approach, a speaker model tree is first generated using one of the methods described above, and cohorts are defined for the leaf members. A complementary speaker model or models is then generated for each cohort, representing a merger of speaker models outside the cohort. When performing speaker verification for a claimant corresponding to a target model and cohort, the test model is compared to all members of the cohort as well as to the complementary model(s). If the test model is closer to the complementary model(s) than to the target model, the speaker is rejected.

With the CCM method, a single complementary model is created, which is used as a representation of all the models outside the original cohort set, both in the tree and outside the tree (given some background data). By way of example to illustrate the CCM method, as shown in FIG. 4, it is assumed that a claimant to be verified has indicated his/her identity as corresponding to the speaker model $M_1^i$. This model (the claimed model) is denoted in the figure as a cube. In this simple example, each cohort in the bottommost layer i has two leaf models in it. The cohort of model $M_1^i$ consists of models $M_1^i$ and $M_2^i$. Therefore, during a speaker verification operation, the claimant's test model is compared to these two models to determine which is closest; the claimant is verified if model $M_1^i$ is closest, and rejected otherwise. With the CCM approach, the claimant's test model is also compared to a cumulative complementary model consisting of a merger of the siblings of the claimed model's ancestors. The inherent nature of the tree structure enables this computation to be a very fast one. The sibling(s) of each layer, denoted in the figure as disks, are considered complementary to the claimed model's respective ancestors. In the example shown, the CCM consists of a merger of model $M_2^{i+1}$ (which is the sibling of parent $M_1^{i+1}$ in layer i+1) with model $M_2^{i+2}$ (which is the sibling of grandparent $M_1^{i+2}$ in layer i+2) and background model $M_B$, if one is available. If the distance between the test model and the CCM is closer than the distance between the test model and the claimed model $M_1^i$, the claimant is rejected. As a result, false acceptances are reduced. It is noted here that background model $M_B$ is a model generated based on speaker models of speakers that are not part of the speaker model tree (i.e., they represent a background population).

In a more practical situation, the number of leaves (speaker models) in the bottommost layer i may be on the order of 1,000 and the number of leaves in each cohort set may be on the order of 10.

With the graduated complementary model (GCM) approach, complementary models are computed for each layer and added to the cohort set, rather than being merged together as a single CCM to be added. Thus, in the example of FIG. 3, where the claimed model is $M_1^i$, the original cohort set consisting of models $M_1^i$ and $M_2^i$ is augmented by three models, $M_2^{i+1}$, $M_2^{i+2}$ and $M_B$. If the verification finds one of these complementary models to be the closest to the test speaker, the speaker is rejected.

The GCM method has an inherent confidence level associated with it. The higher the level (closer to the root), the more confident the rejection decision. Since no merges are necessary, the training is faster than CCM, but the testing is slower due to the larger cohort size.

Figure 5:
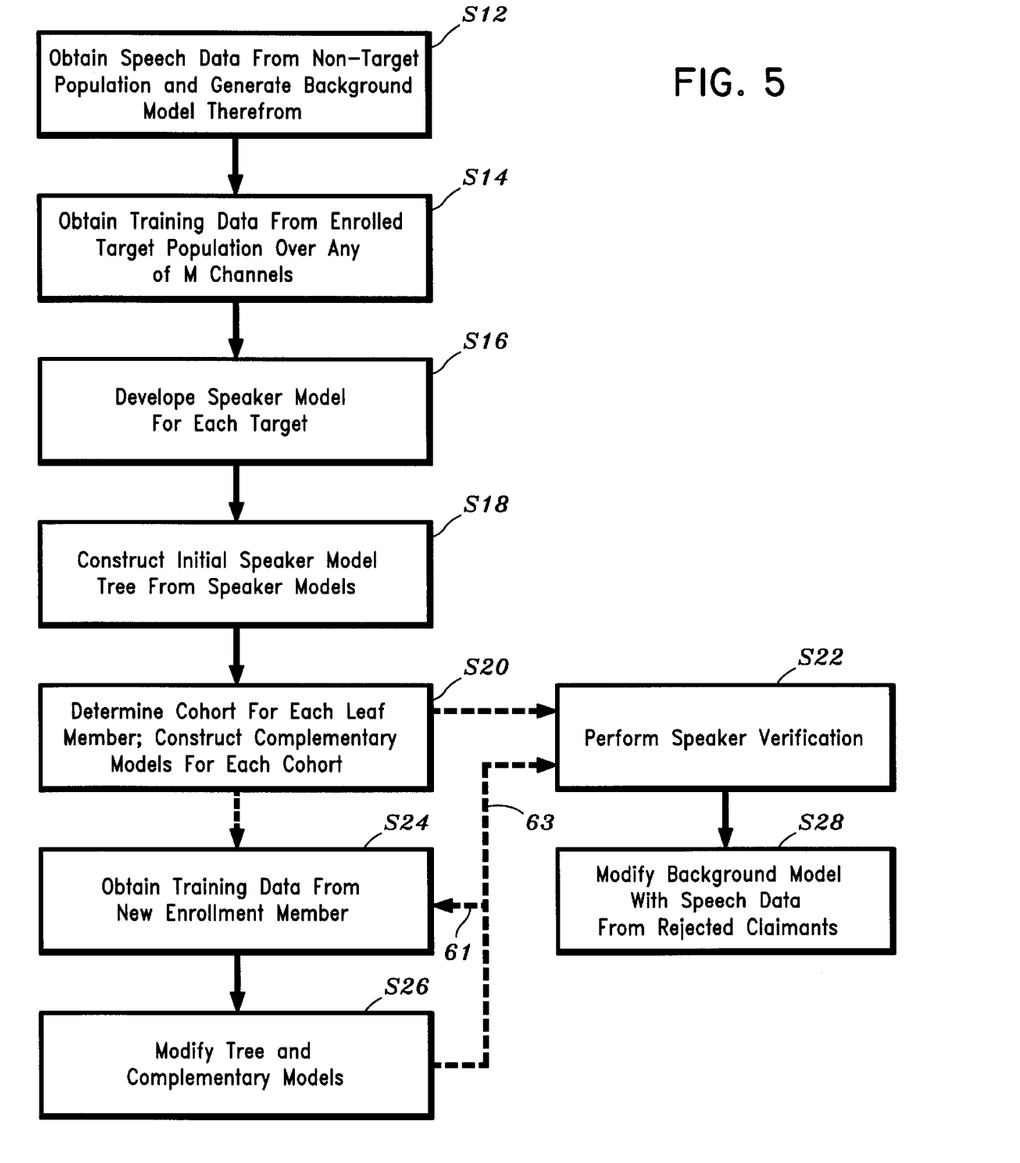
FIG. 5 is a flow chart of an exemplary routine for deriving a speaker model tree as well as complementary speaker models in accordance with the invention.

Turning now to FIG. 5, a flow chart depicting an exemplary routine for performing unsupervised environment normalization in accordance with the invention is shown. In step S12, speech data is first obtained from members of the non-target population, i.e., from sources $S_{T+1}$ to $S_N$ in the diagram of FIG. 1, to develop an optional background model $M_B$, i.e., the complement of root model $M_{FINAL}$ of FIG. 4. In step S14, training data is obtained from the enrolled target population, i.e. sources $S_1$ to $S_T$, over any of the M channels.

A speaker model, consisting of a collection of distributions of audio feature data, is then developed for each target member $S_1$ to $S_T$ (step S16). Next, an initial speaker model tree is constructed (step S18) using the aforedescribed top down or bottom up method. In step S20, each leaf speaker model is then grouped into a cohort set, and complementary models are constructed for each cohort, e.g., using the CCM or GCM methods described above. The background model $M_B$ is optionally included as part of the CCM or as a separate complementary model if the GCM approach is used.

At this point, a speaker verification operation can be performed (step S22). In addition, training data from a new member to be enrolled can be obtained in step S24, over one of the existing M channels or over a new channel. With this training data from the new member, both the speaker model tree and the complementary models are updated in step S26. Subsequently, speaker verification can again be performed with the new tree and models (path 63) or further enrollment can be conducted (path 61). Whenever speaker verification is performed, test data from claimants who are rejected may be added to the background model (step S28).

Accordingly, with this unsupervised technique, the tree along with the associated complementary models are modified "on the fly". Each new instance of enrollment data may be taken via an entirely new channel. Hence, the method allows for adaptation to data from new environments by incorporating such data into the verification models whenever it is encountered.

Returning to the tree-building process, the nature and number of refinements of the tree-building operation is a control parameter which determines the characteristics of the complementary models. By varying the splitting criterion in the top down approach or the grouping criterion in the bottom up approach, it is possible to trade off channel properties and source properties. For example, in the top down approach, by initially partitioning with respect to channel properties for a few iterations and then subsequently with respect to source properties, the cohorts would contain similar sources over the same or similar channels. This is one of many combinations that could be achieved.

Figure 6:
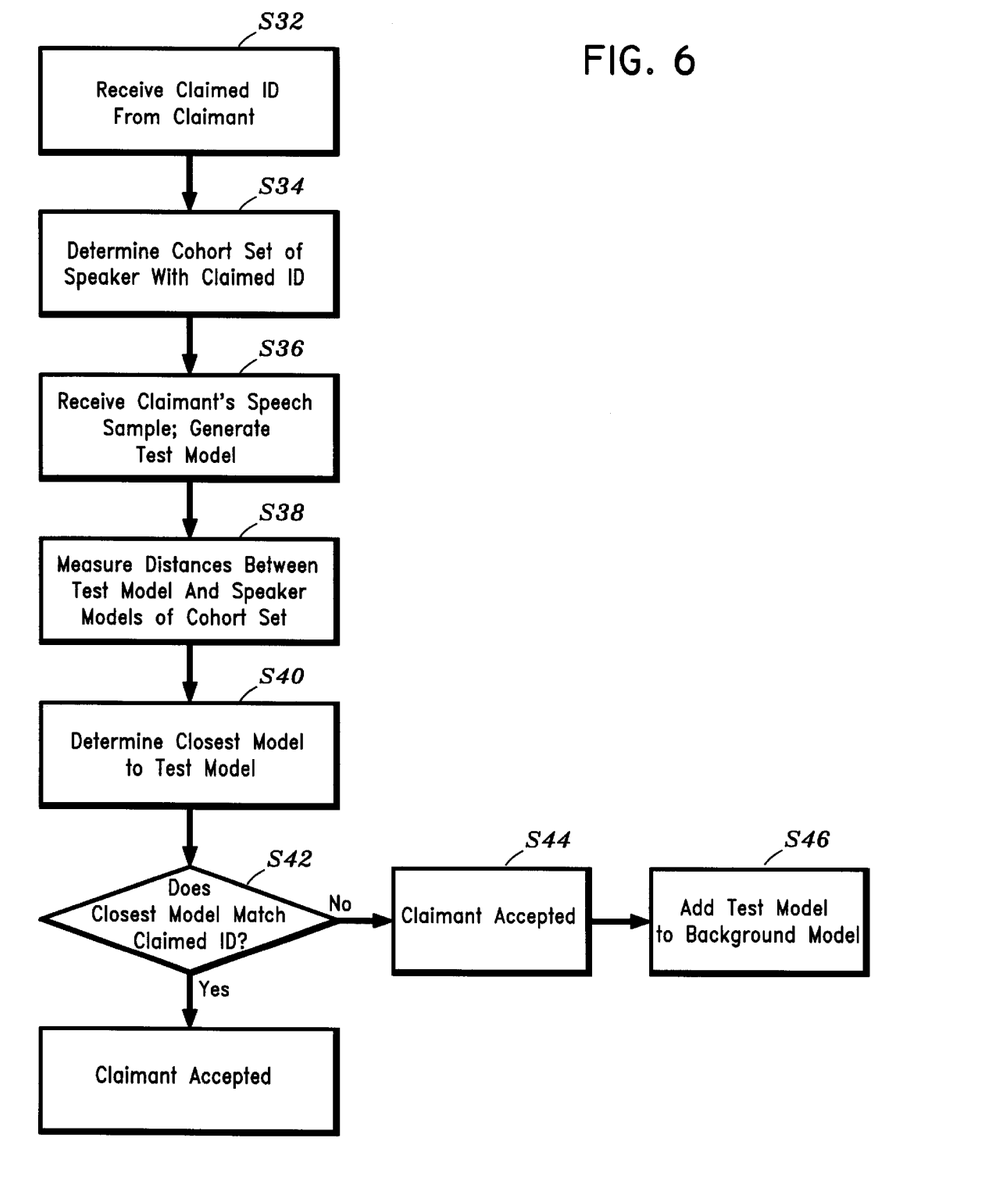
FIG. 6 is a flow diagram of a routine for performing speaker verification.

With reference now to FIG. 6, a flow diagram of an illustrative software routine for implementing a speaker verification operation employing a speaker model tree is shown. The objective is to determine whether or not a person (the claimant) claiming to be an enrolled target member who has previously submitted a speech sample to the system, is actually that member. The verification system is particularly useful in security applications. The routine utilizes a database (training data) of hierarchical speaker models, i.e., a speaker model tree, which was previously generated as described hereinabove.

The routine commences upon the reception of the claimed identification (ID) from the claimant (step S32) via a suitable user interface such as a computer terminal or a speech recognition system prompting the claimant to state his/her name. If the claimed ID corresponds to a person registered with the system, the routine then determines the cohort set of the speaker with the claimed ID (step S34). (If the claimed ID is not registered, the claimant would be rejected at this point.) The cohort set is determined from the speaker model tree (see FIG. 2) by first matching the label of the claimed ID with one of the leaf members; then traversing up the tree by as many layers as desired (based on the required size of the cohort); and finally, going back down from the resulting ancestor to all the leaves leading to that ancestor. The models in these leaves constitute the cohort, and correspond to those speakers whom are closest to the claimed speaker.

Next, in step S36, the claimant is prompted to speak for several seconds. The speech is recorded and converted to feature vectors, which are used to generate a collection of feature vector distributions constituting a test model, typically in the same manner as for the leaf models. The distances between the test model and the speaker models in the cohort set are then measured (step S38), preferably using the approach in the copending patent applications mentioned above. The test model is also compared to the latest complementary model(s). Based on the distance measurements, the closest speaker model to the test model is extracted (step S40). If the extracted model corresponds to the claimed ID in step S32, then the claimant is accepted (verified); otherwise, he/she is rejected (step S44). A rejection also occurs if any of the complementary or background models is closest to the test model. If a claimant is rejected, his/her test data may be added to the background model $M_B$ in step S46.

The above-described speaker verification technique is particularly useful when the number of registered speakers is very large. Since the routine need not compare the claimant's test model to each speaker model of the system, the processing task is simplified.

EXEMPLARY VERIFICATION DECISION FUNCTION AND EXPERIMENTAL RESULTS

The following verification decision function and experimental results are presented by way of example only to illustrate the benefits of the present invention.

The set of speakers can be denoted by:

$$M_i = (\vec{\mu}_{i,j}, \Sigma_{i,j}, p_{i,j})_{j=1,\ldots,n_i} = (\Theta_{i,j})_{j=1,\ldots,n_i}$$

consisting of the mean vector, covariance matrix, and mixture weight for each of the $n_i$ components of the $i^{th}$ Gaussian Mixture Model (GMM). We use $n_i=32$ Gaussians, obtained using the LBG algorithm, to model the training data for each speaker. The base data is 12 dimensional cepstra. The only further processing that is done is to normalize for the mean and include delta and delta-delta parameters (where d is the size of the final vector). It is important to note that no form of silence or noise removal is implemented, as one of the goals is to include channel effects in the hierarchical model. Next, a bottom up binary clustering of the data is done based on a distance measure between models $D(M_i, M_j)$ described in the aforementioned copending U.S. Patent Application entitled METHOD FOR MEASURING DISTANCE BETWEEN COLLECTIONS OF DISTRIBUTIONS.

The test data is denoted as $O = \{\vec{f}_n\}_{n=1,\ldots,N}$, and it is assumed to be i.i.d. Further, we assume that the covariance matrices $\{\Sigma_{i,j}\}$ are diagonal, and write $\Sigma_{i,j}(k)$ for the variance of the $k^{th}$ dimension. The mixture weights constitute a probability mass function on the mean vectors of any given model. Let $p_i(\vec{f}_n)$ be the probability of observing frame $\vec{f}_n$ with respect to $M_i$.

Given the observed testing data and an identity claim i, verification proceeds by comparing $$\log P(O|M_i) = \sum_{n=1}^{N} \log p_i(\vec{f}_n) \quad (1)$$

$$= \sum_{n=1}^{N} \log\left[\sum_{j=1}^{n_i} p_{i,j} p(\vec{f}_n | \Theta_{i,j})\right] \quad (2)$$

where, when using a Normal pdf, $$p(\vec{f}_n \mid \Theta_{i,j}) = \frac{1}{(2\pi)^{d/2}|\Sigma_{i,j}|^{1/2}} e^{-\frac{1}{2}(\vec{f}_n - \vec{\mu}_{i,j})^t \Sigma_{i,j}^{-1}(\vec{f}_n - \vec{\mu}_{i,j})}$$

to $$\log P(0)|\text{cohort of } M_i\text{-}M_i)$$

Figure 7:
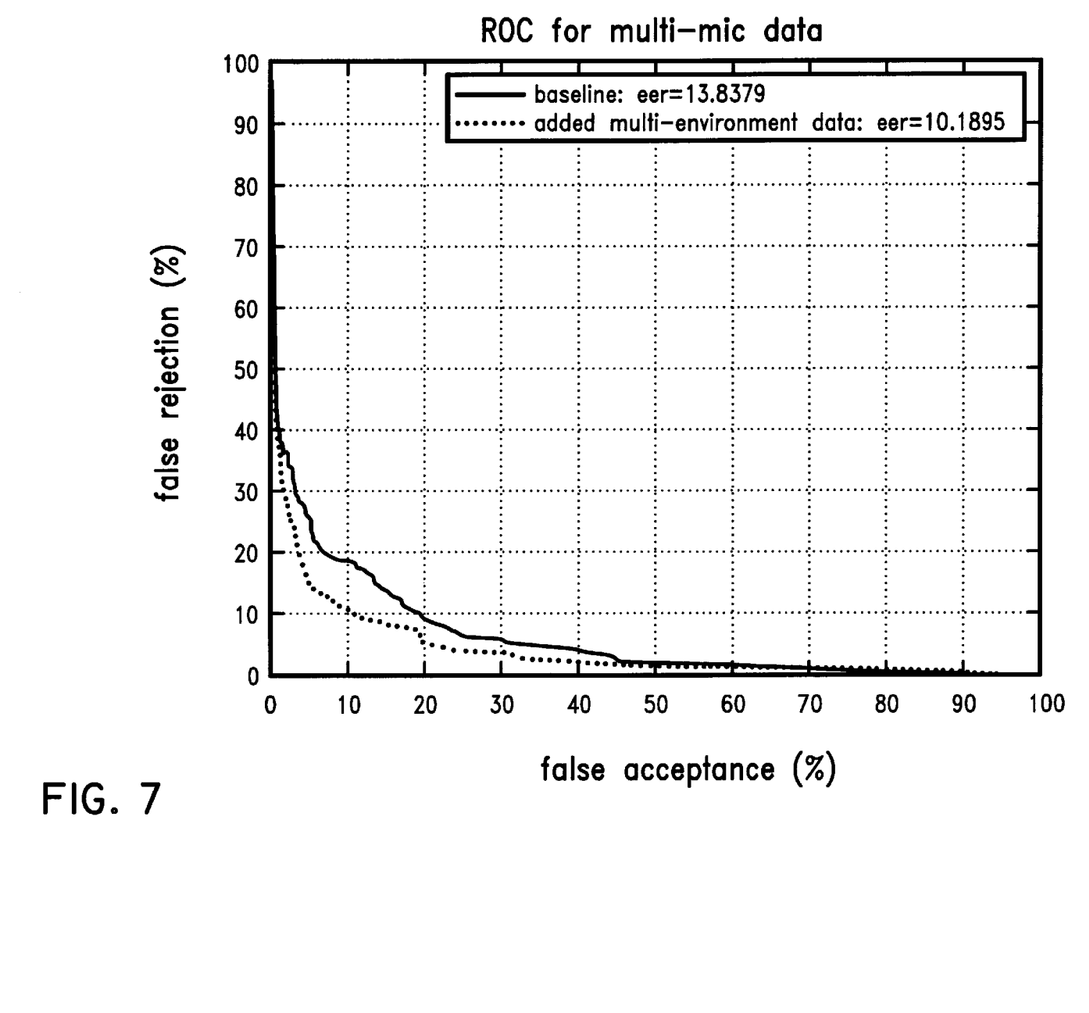
FIG. 7 is a graph depicting experimental results for an exemplary speaker verification method in accordance with the invention.

However, in the experiments, the following was used:

$$\sum_{j \in cohort-i} w_j \log P(0 \mid M_j),$$

where $w_j$ was chosen to be uniform. The verification score used in obtaining the ROC curves presented in FIG. 7 is given by the difference of these two values. The procedure is thus text-independent.

To collect training and testing, eight microphones of different manufacturers or types were used. All training data for a given speaker, i.e., that used during enrollment to create finest grain models, was collected from only one of these microphones. The testing data for that speaker was collected on the training microphone (the matched case) as well as on one of the other eight microphones (the mismatched case). The imposter trials were from any of the eight microphones.

In the experiments, both male and female speakers were used; however, for any given piece of training or test data, the gender was unknown. In addition, it was attempted to obtain an even distribution of microphones for training and testing. To make the experiments realistic, the amount of training and test data was limited to about 10 seconds. There were a total of 222 speakers enrolled in the final tree that was built. For the target population, a 28 speaker subset was taken out of the full training population. It is noted that any of the 222 could have been chosen, because complementary/background models can be generated for all of them. There were 199 matched verification tests, 214 mismatched tests, and 382 imposter tests. The impostors were taken from a population that excluded any of the enrolled speakers.

The results are depicted in FIG. 7. The effect that is characterized is the change in verification performance which resulted from the change in cohort character when more enrollment data was added to the tree. The first tree that was built had 125 speakers in it; the final tree had 222 speakers as mentioned earlier. The percentage of data from each microphone was roughly the same. The solid curve in FIG. 7 gives the performance for the baseline tree. Then, speakers were added to the baseline tree from the eight different environments, again trying to keep the balance of the microphones the same. The dotted curve in the figure gives the performance for this latter case. While the microphone composition of the data that was enrolled in the hierarchical structure was known, this information was not used in any way. The procedure to modify the tree was thus unsupervised with respect to the microphone label. A significant difference in performance is noticed uniformly over the curves.

From the foregoing, thus disclosed is a method and apparatus for building a hierarchical model tree structure purely out of enrollment data without specific knowledge of the channel (e.g., microphone) over which the data was collected. The technique enables the construction of complementary/background models for pattern matching (e.g., speaker verification) on the fly, whose nature changes as more enrollment data is obtained.

It is noted that the sizes of the cohorts are preferably not changing as sources (e.g. speakers) are added (enrolled); however, their character, or more precisely, their composition, is changing to reflect the additional, unlabeled data. The results obtained indicate that it is possible to exploit the efficient enrollment procedure to handle verification in multiple training and testing environments without having to resort to expensive supervised techniques.

While the present invention has been described above with reference to specific embodiments thereof, it is understood that one skilled in the art may make many modifications to the disclosed embodiments without departing from the spirit and scope of the invention as defined by the appended claims.

What is claimed is:

1. A computer-implemented method, comprising:
   obtaining training data from each of a plurality T of sources constituting an enrolled population, over a plurality M of channels;
   developing models for each of said T sources based on said training data, each model containing a collection of distributions;
   generating a hierarchical model tree based on said models of said I sources, wherein at least some merged models within layers of said hierarchical model tree are computed via partitioning or grouping with respect to channel properties; and
   obtaining training data from a new source over a new channel for addition to said enrolled population, developing a new model based thereupon and updating said hierarchical model tree with said new model.

2. The method of claim 1 wherein said each of said plurality T of sources comprises a source of speech from a particular speaker, and said models comprise speaker models.

3. The method of claim 2, wherein said method is utilized for speaker verification.

4. The method of claim 1, further comprising the steps of:
   defining a plurality of cohorts for models in the lowest layer of the tree, with each cohort being of generally equal size and containing models which are similar to one another.

5. The method of claim 4, further comprising the step of:
   generating, for a particular cohort, at least one complementary model representing a merger of speaker models outside said particular cohort.

6. The method of claim 5, further comprising the step of updating said complementary model when a new source and corresponding model is added to said enrolled population.

7. The method of claim 5, wherein said at least one complementary model is a cumulative complementary model which is a model formed by merging models on multiple levels of said tree that are outside said particular cohort.

8. The method of claim 5, wherein said at least one model comprises a plurality of merged models, each merged model being a sibling model of an ancestor of a model within said particular cohort.

9. The method of claim 1 wherein:
   each said model contains a collection of distributions of feature data associated with the corresponding source; and
   said step of generating a hierarchical model tree comprises merging similar models on a layer by layer basis.

10. The method of claim 9 wherein said feature data comprises image data.

11. The method of claim 1 wherein said hierarchical model tree is generated using a top down technique in which a merged model of all models of the T sources is sequentially partitioned on a layer by layer basis.

12. The method of claim 1 wherein each said distribution is a multi-dimensional Gaussian distribution.

13. A speaker verification method comprising the steps of:
   obtaining training data from each of a plurality T of sources constituting an enrolled population, over a plurality M of channels;
   developing speaker models for each of said T speakers based on said training data, each model containing a collection of audio feature distributions;
   generating a hierarchical speaker model tree based on said models of said T speakers, wherein at least some merged models within layers of said hierarchical speaker model tree are computed via partitioning or grouping with respect to channel properties;
   receiving a claimed identification (ID) of a claimant, said claimed ID representing a speaker corresponding to a particular one of said speaker models;
   determining a cohort set containing said particular speaker model and similar speaker models thereto;
   receiving data corresponding to a speech sample of said claimant and generating a test speaker model therefrom; and
   comparing said test model to all speaker models of said cohort set and verifying said claimant if said particular speaker is the closest model of said cohort set to said test model.

14. The method of claim 13, further comprising the steps of:
   generating a single cumulative complementary model (CCM) by merging complementary speaker models outside said cohort set; and
   rejecting said claimant if said test model is closer in distance to said CCM than to said particular model.

15. The method of claim 14, wherein said complementary speaker models include a background model derived from speech data of speakers outside said tree.

16. The method of claim 13, further comprising the steps of:
   generating a plurality of complementary speaker models, each being a sibling speaker model of an ancestor of said particular speaker model; and
   rejecting said claimant if said test model is closer in distance to any one of said complementary speaker models than to said particular speaker model.

17. The method of claim 16, further comprising providing a background speaker model derived from speakers outside said tree, and rejecting said claimant if said test model is closer in distance to said background speaker model than to said particular speaker model.

18. A program storage device readable by a machine, tangibly embodying a program of instructions executable by the machine to provide method steps for performing pattern matching, said method comprising:
   obtaining training data from each of a plurality T of sources constituting an enrolled population, over a plurality M of channels;
   developing models for each of said T sources based on said training data, each model containing a collection of distributions;
   generating a hierarchical model tree based on said models of said T sources, wherein at least some merged models within layers of said hierarchical model tree are computed via partitioning or grouping with respect to channel properties; and
   obtaining training data from a new source over a new channel for addition to said enrolled population, developing a new model based thereupon and updating said hierarchical model tree with said new model.

19. The program storage device of claim 18, wherein said each of said plurality T of sources comprises a source of speech from a particular speaker, and said models comprise speaker models.

* * * * *